United States Patent

[11] 3,588,798

| [72] | Inventor | Milton D. Papineau<br>San Diego, Calif. |
|---|---|---|
| [21] | Appl. No. | 846,910 |
| [22] | Filed | Aug. 1, 1969 |
| [45] | Patented | June 28, 1971 |
| [73] | Assignee | The United States of America as represented by the Secretary of the Navy |

[54] LOCATING TRANSDUCER ARRAY ON KEEL
5 Claims, 3 Drawing Figs.

| [52] | U.S. Cl. | 340/6-R, 340/5-C |
|---|---|---|
| [51] | Int. Cl. | G01s 3/00 |
| [50] | Field of Search | 340/3, 5, 6, 5(C), 8, 9 |

[56] References Cited
UNITED STATES PATENTS
2,999,225   9/1961   Gregg, Jr. et al..............   340/8

*Primary Examiner* — Richard A. Farley
*Attorneys* — R. S. Sciascia, George J. Rubens, John W. McLaren and Thomas M. Phillips ABSTRACT: To locate a ship-mounted transducer array with respect to the fire control centerline of the ship, the ship is anchored, and three acoustic projectors are spaced about the ship at fixed known positions. One element of the array is used as a receiver for two of the projectors. The signal of the nearest is delayed to null with the signal of the other projector, and the process is repeated for the other pair of projectors. The two intersecting hyperbolas pinpoint the array.

Patented June 28, 1971

INVENTOR.
MILTON D. PAPINEAU
BY
ATTORNEYS

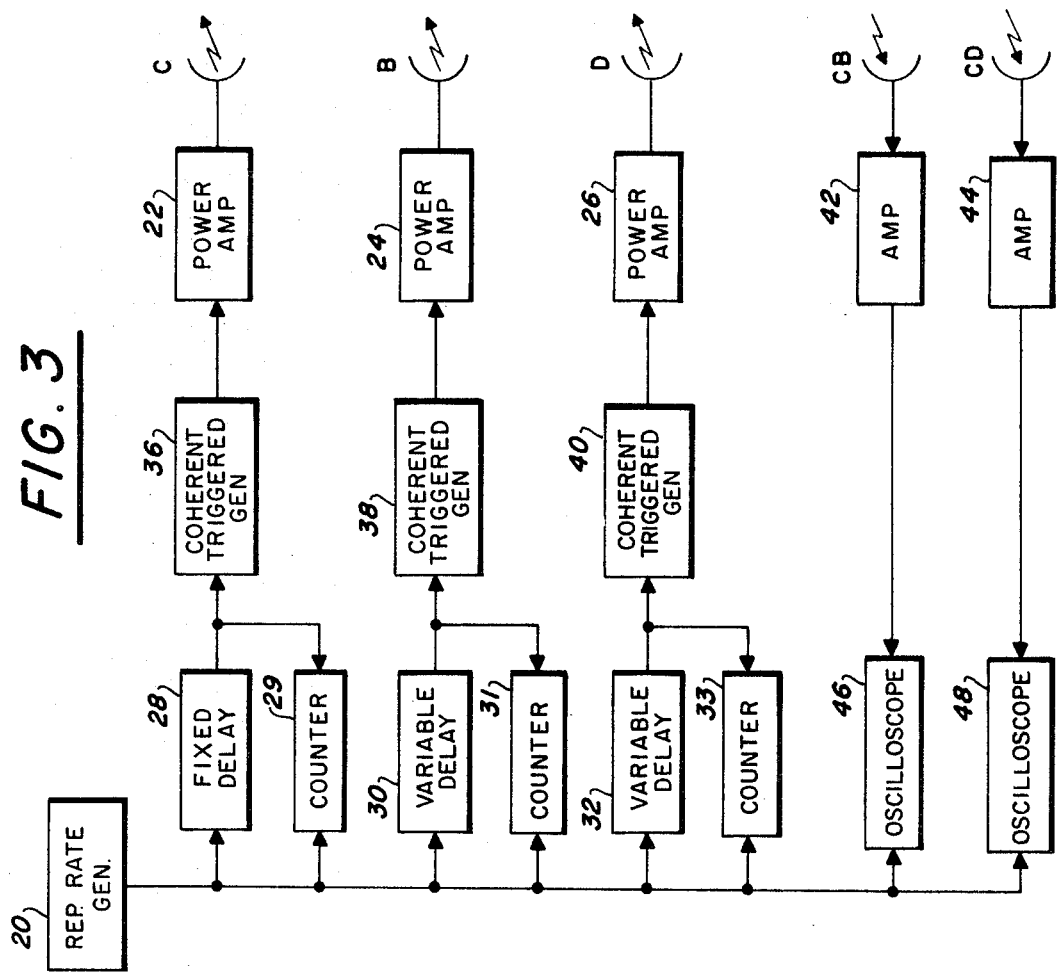
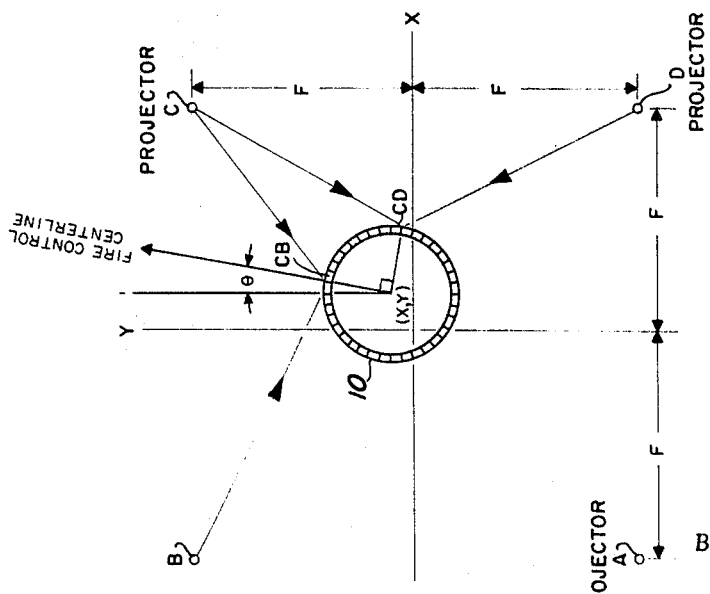
INVENTOR.
MILTON D. PAPINEAU 3,588,798

LOCATING TRANSDUCER ARRAY ON KEEL

STATEMENT OF GOVERNMENT INTEREST

The invention described herein may be manufactured and used by or for the Government of the United States of America for governmental purposes without the payment of royalties thereon or therefore.

BACKGROUND OF THE INVENTION

For the beam of a beam-forming transducer array to produce meaningful information concerning the direction of the beam and hence the direction of the targets, it is necessary to know the precise location of the beam with respect to the fire control centerline of the ship. It is not enough to merely measure the location of the array from drawings of the equipment, since many factors other than placement can effect the direction and position of the beam. The transducer array cannot be bore sighted, as a rifle, because the array, weighing many tons, must be suspended from the ship which must be afloat. Even in protected waters the floating ship is always moving to further complicate calibrations.

The object of this invention is to provide improved means for precisely locating and orienting a beam-forming array with respect to its supporting ship.

SUMMARY OF THE INVENTION

The objects of this invention are attained by anchoring the ship in protected waters with yieldable lines to permit the usual limited motion. Around the bow of the ship where the transducer array is located is fixed a plurality of spaced sound projectors. The projectors are preferably located at the corners of a known square and are bottom mounted. Then, one of the elements of the transducer array is connected to a receiver and two of the projectors within line-of-sight of the element, are energized by a pair of generators to transmit sound waves to the selected receiving element. The phase of the signals of one projector is adjusted with respect to the phase of the other projector until a null results, the amount of delay being a direct measure of the difference in ranges from the two projectors to the receiving element. The process is repeated for another pair of projectors and another receiving element of the array to find a second hyperbola approximately at right angles to the first. It is a matter of geometry to determine the precise position of the center of the array.

Other objects and features of this invention will become apparent to those skilled in the art by referring to the preferred embodiments described in the following specification and shown in the accompanying drawing in which:

FIG. 2 is a geometric diagram illustrating the mathematical problems to be solved in this invention; and FIG. 3 is a block diagram of the essential elements of one circuit contemplated in this invention.

Figure 1:
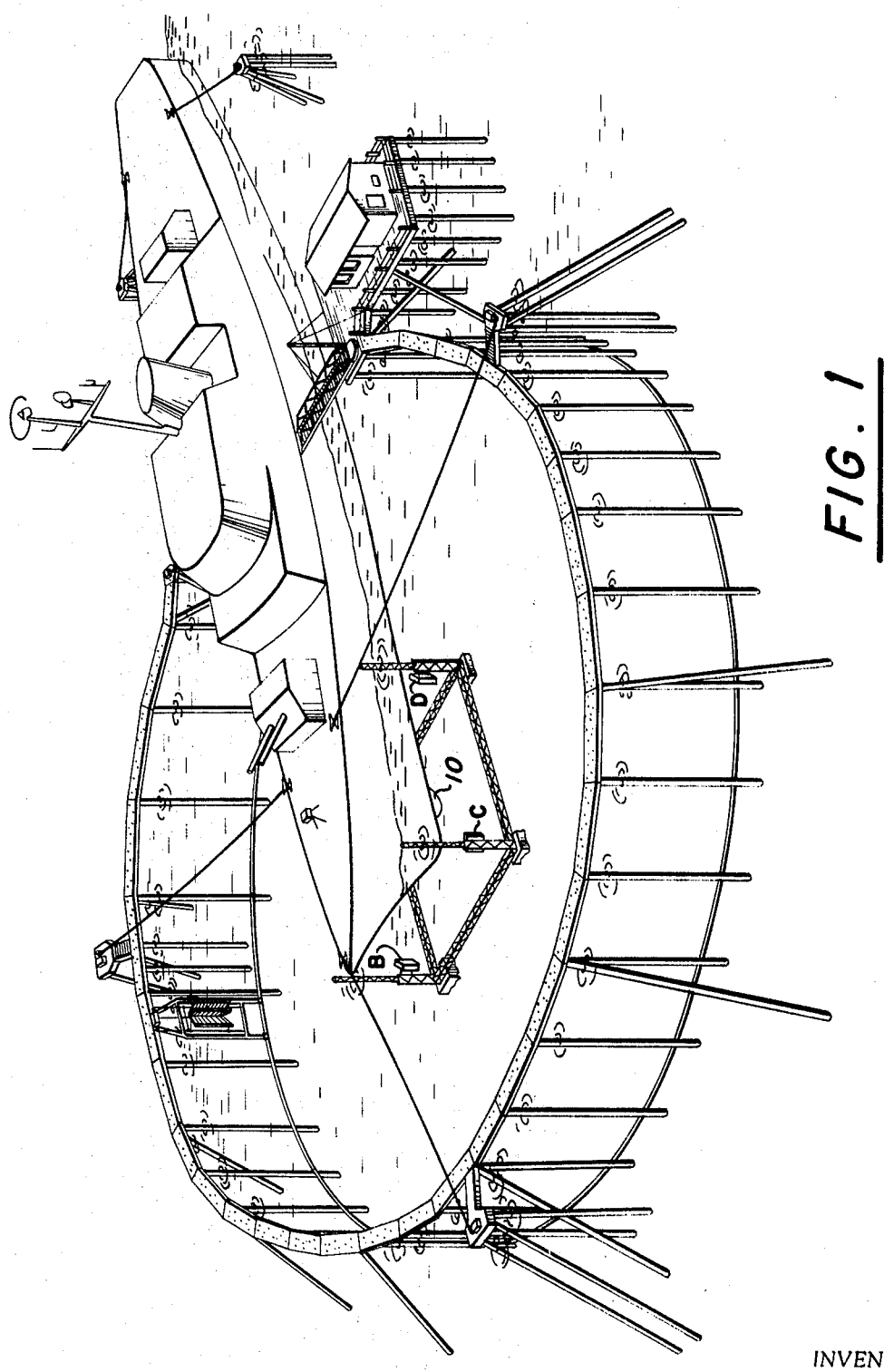
FIG. 1 is a phantom view, partly in perspective, of a ship carrying a transducer array, the position of which is to be geographically located.

The ship to be calibrated shown in FIG. 1 may be any of the common Navy vessels. Usually suspended below the keel near the bow is a flooded sound-transparent dome 10 housing the transducer array. The ship is winched into the position shown with the forward portion of the ship more or less centered in the circle of piling. Preferably, the test site is in a protected area with about 50 feet of water to accommodate the craft at low tide and to clear various equipment installed on the bottom under the bow. The circular catwalk on the piling facilitates the movement of a hydrophone for measuring the directional pattern of the array 10.

According to this invention four projectors A, B, C and D are placed at the corners of a precisely constructed square frame resting on the bottom. Conveniently, each projector may be mounted upon a column, hinged near its lower end to be framed so that it can be lowered out of position while the ship is being maneuvered into position.

Let it be assumed that the A B, C and D square defined by the frame and the four projectors establishes the XY coordinates shown in FIG. 2. An XY grid is established using the $x$, $y$ point 0, 0 at distances F from the projectors, as the grid center. Orientation of the grid as to compass bearing is not important at this juncture, but the angle between the ship's centerline and the lines of the grid is important and is determined by means not disclosed here. The angle is used in the computation to obtain the $x$, $y$ coordinates of the center of the array 10. Any offset of the array centerline with respect to the ship's centerline must of course be approximately added to the grid coordinates. The ship's centerline can be between two adjacent transducer staves of the circularly arranged elements of the array. If there are 48 elements in the circle, 7.5 apart, the ship's heading would be 3.75° from the nearest element, CB.

While all of the elements of the array have leads, the connections to the elements CB and CD are of particular interest and are brought out to receiving equipment either aboard ship or in the instrument hut, shown in FIG. 1. If the array is circular, elements CB and CD are at right angles in the array circle and in any case must be, respectively, in line-of-sight with projectors C and B, and C and D.

According to this invention a hyperbolic line of positions is determined by measuring the difference in length of the two lines to one receiver, which is measured by timing the interval between pulses at the projectors B and C for producing a null at the receiver CB. Likewise, a hyperbolic line of positions for element CD is determined by the differences in ranges from C and D to element CD. From these two hyperbolas, the determined grid-to-centerline angle, and with the known fixed right angle triangle, the position of the point $xy$ can be fixed with respect to the coordinates XY and the ship's fire control centerline.

One electronic implementation of the geometric problem just outlines is shown in FIG. 3. At 36, 38 and 40 are shown coherent triggered generators, all capable of generating waves of identical shapes and frequencies. Importantly, the generators each will start generating an output voltage at one selected point on the wave. The generators may each, for example, comprise an electronic oscillator and with a sinusoidal alternating current output wave, and the starting point, desirable, may be at the zero or crossover point of the wave. Further, the start of the oscillation is preferably in response to a sharp well defined voltage spike. Still further, the phase of the output signal of generator 36 and projector C is opposite to the phase of the output signal of generators 38 and 40, and projectors B and D.

The voltage spikes for triggering the coherent generators are produced in the repetition $o$ rate generator 20. According to one of the features of this invention the signal wave to projector C is delayed a fixed amount by delaying the starting spike in fixed delay 28. Let it be assumed that this fixed delay is 10 units of time such as 10 milliseconds. Conveniently, the high-speed counter 29 can be connected across the delay to measure the delay. However, the start time of the wave delivered to projectors B and D are variable different amounts by the variable delay devices of 30 and 32, respectively. Since the ship is moveable it becomes apparent that the length of the line C–CB can be greater than or less than the length of line B–CB, and it becomes apparent that the variable delay 30 must be adjustable to values either greater than or less than the fixed delay of 28. The same observation can be applied to the positive and negative difference between the lines C–CD and D–DC and the variable delay 32.

As stated above, the object of this invention is attained by nulling the signal received from two projectors at one receiving element. To this end, the starting time of the projected waves from B and D are adjusted until the signal at the receiving hydrophones CB and CD are zero or at a minimum.

The receiving elements CB and CD are connected, respectively, to amplifiers 42 and 44 and hence to vertical deflection plates of oscilloscopes is provided by the local rep rate generator 20.

In operation the entire water mass is signified by projectors C and B and then the variable delay 30 is manipulated until the oscilloscope 46 indicates there is a minimum signal occurring at receiving element CB. The amount of delay of device 30 is recorded by counter 31, which can be calibrated in units of length such as feet and inches or centimeters. Likewise, variable delay 32 is manipulated until the signal on oscilloscope 48 is a minimum indicating a null of the two projectors at element CD. There upon, the amount of delay of device 32 shown by counter 33 is recorded. Suitable amplification of the signals are provided at 22, 24, 26, 42 and 44.

The difference between the count in counters 29 and 31 and the difference between the count in counters 29 and 32 yield directly the important difference measurements necessary for establishing the two intersecting hyperbolas.

I claim:

1. A sonar accuracy check system for measuring and locating with respect to a fixed geographic position the field of an array of shipboard-mounted sonar elements, said system comprising:
   means for anchoring the ship to be tested on an approximate predetermined heading,
   a plurality of sonar projectors spaced about said ship at predetermined fixed locations,
   a sonar receiver with means for connecting the receiver to one of the transducer elements of said array,
   means coupled to said receiver for indicating the amplitude of sonar signals arriving at the connected transducer element,
   two signal generators coupled, respectively, to each of a one pair of said projectors, and
   means for delaying in adjustable measurable amounts of the start of the signal applied to one projector with respect to the start of the signal applied to the other projector, for producing a resultant signal at said connected transducer element of a predetermined value so that the measured delay between the two starts can be calibrated in terms of difference in distances of said transducer element to said two projectors to establish a hyperbolic line of positions.

2. The sonar accuracy check system defined in claim 1 further comprising:
   means for connecting a second one of said transducer elements of said array to said receiver,
   means for coupling said two signal generators to a second pair of said projectors and,
   means for delaying in adjustable amounts the start of the signal applied to one projector of said second pair with respect to the start of the signal applied to the other projector of said second pair for producing a resultant signal at said second transducer element of a predetermined value so that the measured delay between starts can be calibrated in terms of differences in distances of said second transducer element to said second pair of projectors to establish a second hyperbolic line of positions.

3. The sonar accuracy check system defined in claim 1 further comprising a rectangular frame resting on the ocean floor approximately centered under said array, said projectors being affixed to the corners of said rectangular frame.

4. In the sonar check system defined in claim 1, said predetermined value of said resultant signal at said connected transducer element being a nullity.

5. The sonar check system defined in claim 1, further comprising:
   a counter connected across said delay means for measuring the time interval between trigger pulse; at input and the output of said delay.